United States Patent
Rieul (12) 
(10) Patent No.: US 10,756,903 B2
(45) Date of Patent: Aug. 25, 2020

(54) METHOD AND DEVICE FOR VERIFYING THE VALIDITY OF AN ELECTRONIC DOCUMENT

(71) Applicant: IDEMIA IDENTITY & SECURITY FRANCE, Issy les Moulineaux (FR)

(72) Inventor: François Rieul, Issy les Moulineaux (FR)

(73) Assignee: IDEMIA IDENTITY & SECURITY FRANCE, Issy les Moulieaux (FR)

( * ) Notice: Subject to any disclaimer, the term of this patent is extended or adjusted under 35 U.S.C. 154(b) by 104 days.

(21) Appl. No.: 15/872,468

(22) Filed: Jan. 16, 2018

(65) Prior Publication Data

US 2018/0205556 A1 Jul. 19, 2018

(30) Foreign Application Priority Data

Jan. 18, 2017 (FR) ...................... 17 50378

(51) Int. Cl.
- *H04L 9/32* (2006.01)
- *H04L 9/30* (2006.01)
- *G06K 7/10* (2006.01)
- *G06K 7/14* (2006.01)
- *G07D 7/0043* (2016.01)

(52) U.S. Cl.
CPC ........ *H04L 9/3247* (2013.01); *G06K 7/10722* (2013.01); *G06K 7/1417* (2013.01); *G07D 7/0043* (2017.05); *H04L 9/30* (2013.01)

(58) Field of Classification Search
CPC ..... H04L 9/3247; H04L 9/30; G06K 7/10722; G06K 7/1417; G07D 7/0043
See application file for complete search history.

(56) References Cited

U.S. PATENT DOCUMENTS

| | | | |
|---|---|---|---|
| 8,231,057 B1 | 7/2012 | Buentello et al. | |
| 9,331,856 B1 * | 5/2016 | Song | H04L 9/3247 |

(Continued)

FOREIGN PATENT DOCUMENTS

| | | |
|---|---|---|
| EP | 1 548 641 A1 | 6/2005 |
| EP | 1 662 699 A1 | 5/2006 |

(Continued)

OTHER PUBLICATIONS

Li et al.; AuthPaper: Protecting Paper-based Documents and Credentials using Authenticated 2D Barcodes, 2015, IEEE, pp. 7400-7406. (Year: 2015).*

(Continued)

*Primary Examiner* — Matthew Smithers
(74) *Attorney, Agent, or Firm* — Oliff PLC; R. Brian Drozd (57) ABSTRACT

A method and device for verifying the validity of an electronic document is provided. A device for capturing images and capturing a sequence of images displayed by a device for presenting the electronic document is activated. The sequence of images may include different two-dimensional barcodes displayed successively one after the other, where the two-dimensional barcodes represent a signature of the electronic document and parts of the electronic document. The two-dimensional barcodes are decoded, and the validity of the signature is verified by means of a public key. A message representing the result of the verification is generated.

9 Claims, 5 Drawing Sheets

(56) References Cited

U.S. PATENT DOCUMENTS

| | | | |
|---|---|---|---|
| 2003/0089764 A1* | 5/2003 | Meadow | G06Q 20/341 235/375 |
| 2006/0117182 A1* | 6/2006 | Wolff | G06F 21/64 713/176 |
| 2009/0185713 A1* | 7/2009 | Koike | G06F 21/608 382/100 |
| 2012/0125997 A1 | 5/2012 | Burra et al. | |
| 2012/0151293 A1 | 6/2012 | Beals | |
| 2012/0211567 A1 | 8/2012 | Herzig | |
| 2014/0254796 A1* | 9/2014 | Li | H04L 9/3247 380/246 |
| 2015/0124965 A1* | 5/2015 | Noe et al. | H04L 9/3247 380/243 |
| 2015/0358164 A1* | 12/2015 | Carter | H04L 9/3226 713/179 |
| 2016/0232734 A1* | 8/2016 | Guajardo Merchan | G07D 7/004 |

FOREIGN PATENT DOCUMENTS

| | | |
|---|---|---|
| EP | 1 467 297 B1 | 8/2009 |
| EP | 2 210 223 B1 | 3/2013 |
| EP | 2 950 238 A1 | 12/2015 |

OTHER PUBLICATIONS

Oct. 30, 2017 Search Report issued in French Patent Application No. 1750378.

Siegemund et al.; "Towards Pervasive Connectivity in Mobile Computing Settings," MPAC '06; Nov. 27-Dec. 1, 2006; Melbourne, Australia; pp. 1-6.

\* cited by examiner

METHOD AND DEVICE FOR VERIFYING THE VALIDITY OF AN ELECTRONIC DOCUMENT

The present invention relates to a method and device for verifying the validity of an electronic document.

The use of electronic documents such as transport tickets, in particular by airlines as well as in land and sea public transport, is tending to increase at the present time.

Such electronic documents are non-physical documents that replace a physical information carrier such as paper with digital information.

A digital document is a form of representation of the information that can be consulted on the screen of an electronic apparatus.

Electronic documents are for example stored in a smartphone and displayed on the screen of the smartphone if needed.

Conventionally, a two-dimensional barcode, such as for example the QR code, is shown on the screen of the smartphone when the document is presented. The QR code is a type of two-dimensional barcode or matrix code consisting of black modules disposed in a square with a white background. The arrangement of these points defines the information contained in the code.

The content of the QR code can be decoded quickly after having been read by a barcode reader, a mobile telephone or a smartphone.

A two-dimensional barcode can contain only a limited quantity of information. For example a version 25 QR code, which comprises 117×117 modules, makes it possible to store fewer than 2 kilobytes with a weak type-L code corrector or even 1 kilobyte with a strong type-H code corrector.

This storage capacity is not suited to documents such as for example passports or driving licenses that include a photograph of the holder of the document. This is because the size of a photograph is at least greater than around ten kilobytes for such documents.

The aim of the present invention is to solve the problems of the prior art by proposing a method and system that allow the presentation of electronic documents containing a large quantity of data in the form of two-dimensional barcodes.

To this end, according to a first aspect, the invention proposes a method for verifying the validity of an electronic document, characterised in that the method comprises the steps of:
 activation of an image-capture device and capture of an image sequence displayed by a device presenting the electronic document, the image sequence consisting of different two-dimensional barcodes displayed successively one after the other, the two-dimensional barcodes representing a signature of the electronic document and parts of the electronic document,
 decoding of the two-dimensional barcodes,
 verification of the validity of the signature by means of a public key,
 generation of a message representing the result of the verification.

The invention also relates to a device for verifying the validity of an electronic document, characterised in that the device comprises:
 means for activating of an image-capture device and capture of an image sequence displayed by a device presenting the electronic document, the image sequence consisting of different two-dimensional barcodes displayed successively one after the other, the two-dimensional barcodes representing a signature of the electronic document and parts of the electronic document,
 means for decoding of the two-dimensional barcodes,
 means for verifying of the validity of the signature by means of a public key,
 means for generating of a message representing the result of the verification.

Thus it is possible to transmit an electronic document containing an electronic signature of the document between a device for presentation of the electronic document and the image-capture device without using a telecommunication network of the cable or radio type. An inspector can thus be informed whether or not the electronic document is valid in any place and/or any situation.

According to a particular embodiment of the invention, the image sequence captured comprises a two-dimensional barcode representing a header comprising the number of two-dimensional barcodes representing the signature of the electronic document and the electronic document.

Thus it is possible to verify that all the two-dimensional barcodes of the sequence of two-dimensional barcodes has indeed been decoded.

According to a particular embodiment of the invention, each two-dimensional barcode is captured at least twice in the image sequence.

Thus the present invention guarantees that each two-dimensional barcode is indeed captured by the image capture device.

According to a particular embodiment of the invention, two different barcodes are separated by an image not representing a two-dimensional barcode.

Thus it is possible to identify simply which captured images comprise the same two-dimensional barcode.

According to a particular embodiment of the invention, each two-dimensional barcode comprises an index allowing reconstruction of the electronic document.

Thus it is possible to reconstruct the electronic document.

According to a particular embodiment of the invention, the image capture device is activated for a predetermined period and the decoding is carried out at the end of the predetermined period.

Thus the present invention is suited to image capture devices having few real-time computing resources.

According to a particular embodiment of the invention, the image capture device is activated as long as the number of two-dimensional barcodes decoded is less than the number included in the header.

Thus any movements made by the user of the device for presenting the electronic document and/or by the inspector do not interfere with the capture of the sequence of two-dimensional barcodes.

According to a particular embodiment of the invention, the method further comprises a step of deciphering the electronic document.

The features of the invention mentioned above, as well as others, will emerge more clearly from a reading of the following description of an example embodiment, said description being given in relation to the accompanying drawings, among which.

Figure 1:
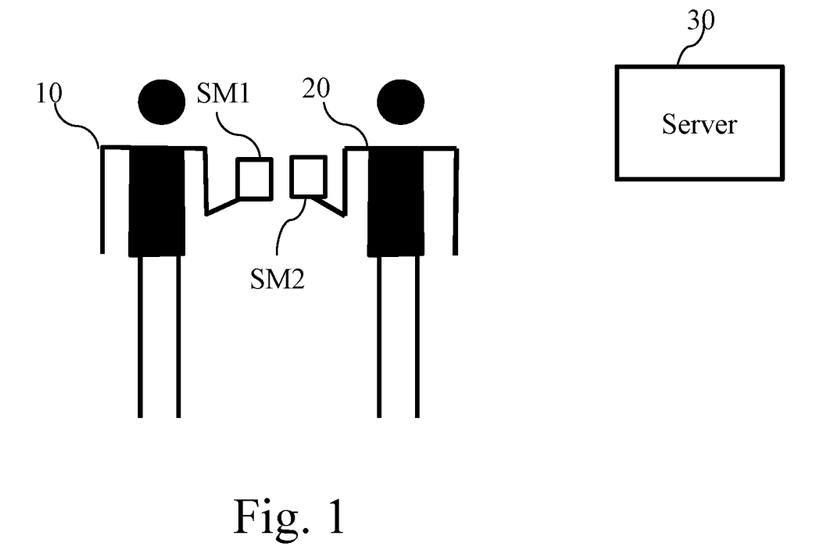
FIG. 1 shows an example of a scene in which the possessor of an electronic document presents it to an inspector.

The possessor 10 of an electronic document presents, by means of an electronic-document presentation device SM1, a sequence of two-dimensional barcodes that represents the data included in the electronic document to an inspector 20. The inspector 20, using an electronic-document reading device SM2, captures the sequence of two-dimensional barcodes and verifies the validity of the data contained in the electronic document.

The electronic document is for example a passport, an identity card, a driving license or other license. The electronic document is for example drawn up by an authority delivering the electronic document, by means of a server 30, to the electronic-document presentation device SM1 of the possessor 10 of the electronic document as well as a signature of the document with a private key. The electronic document is optionally in the form of a sequence of two-dimensional barcodes.

The electronic document consists for example of a photograph of the possessor 10 of the electronic document and data relating to the possessor 10 of the electronic document, signed digitally by means of a private key, and is optionally encrypted.

For example, the photograph of the face of the possessor 10 of the electronic document is compressed in accordance with an algorithm of the JPEG or JPEG 2000 type in order to obtain a compressed image with a size between 10 and 20 kilobytes. The data relating to the possessor 10 of the electronic document have for example a size of less than 1 kilobyte. The data and the photograph of the possessor 10 of the electronic document are signed and comprise a signature associated with the authority with a size of around 1 to 3 kilobytes, which allows verification of the authenticity of the document.

The electronic-document presentation device SM1 is for example a smartphone, a multitouch table or a connected watch.

The inspector 20, using an electronic-document reading device SM2, captures the sequence of two-dimensional barcodes, decodes the two-dimensional barcodes in order to re-form the electronic document and verifies the validity of the data contained in the electronic document by means of the digital signal included in the electronic document and a public key.

The private and public keys are for example of the RSA type.

The sequence of two-dimensional barcodes consists of a header and a plurality of two-dimensional barcodes.

According to the present invention, the validity of an electronic document is verified by:
 activating the image capture device in order to capture an image sequence displayed by the device for presenting the electronic document, the image sequence consisting of different two-dimensional barcodes, the two-dimensional barcodes representing a signature of the electronic document and parts of the electronic document,
 decoding the two-dimensional barcodes,
 verifying the validity of the signature by means of a public key,
 generating a message representing the result of the verification.

Figure 2:
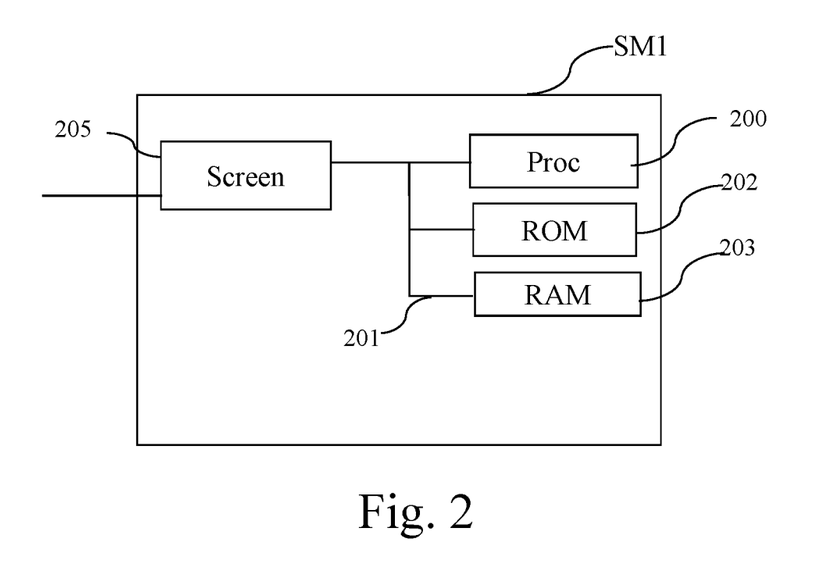
FIG. 2 shows an example of architecture of an electronic-document presentation device in which the present invention is implemented.

FIG. 2 shows an example of architecture of an electronic-document presentation device in which the present invention is implemented.

The electronic-document presentation device SM1 comprises:
 a processor, microprocessor or microcontroller 200;
 a volatile memory 203;
 a non-volatile memory 202;
 a screen 205;
 a communication bus 201 connecting the processor 200 to the ROM memory 202, to the RAM memory 203 and to the screen 205.

The processor 200 is capable of executing instructions loaded in the volatile memory 203 from the non-volatile memory 202, from an external memory (not shown), from a storage medium, such as an SD card or the like, or from a communication network. When the electronic-document presentation device SM1 is powered up, the processor 200 is capable of reading instructions from the volatile memory 203 and executing them. These instructions form a computer program that causes the implementation, by the processor 200, of all or part of the method described in relation to FIG. 6 or even FIG. 5.

Figure 5:
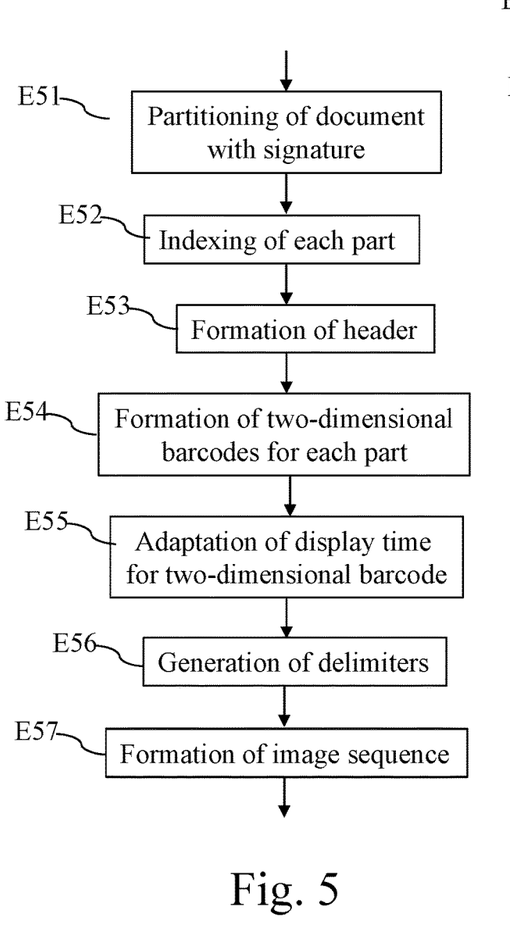
FIG. 5 shows an example of an algorithm for generating a sequence of two-dimensional barcodes according to the present invention.
Figure 6:
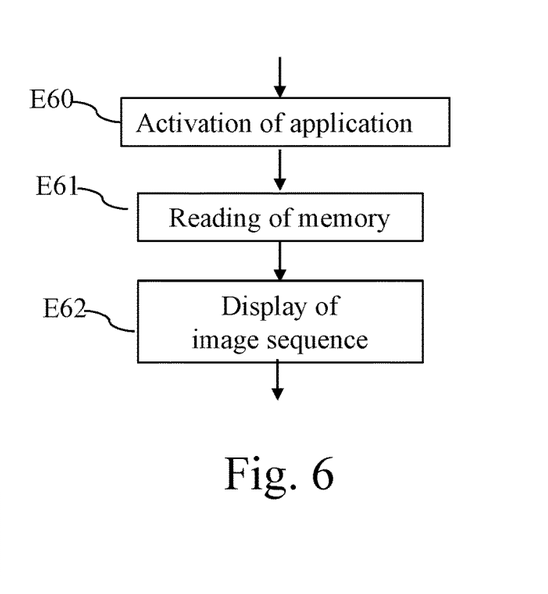
FIG. 6 shows an example of an algorithm for transferring a sequence of two-dimensional barcodes according to the present invention.

All or part of the method described in relation to FIG. 6 or even FIG. 5 may be implemented in software form by the execution of a set of instructions by a programmable machine, such as a DSP (digital signal processor) or a microcontroller, or be implemented in hardware form by a machine or a dedicated component, such as an FPGA (field-programmable gate array) or an ASIC (application-specific integrated circuit).

Figure 3:
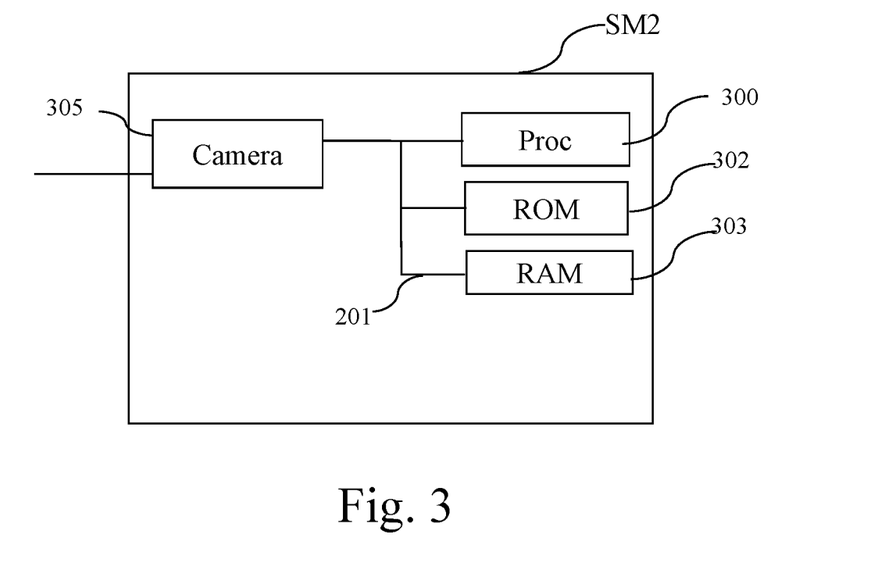
FIG. 3 shows an example of architecture of an electronic-document reading device in which the present invention is implemented.

FIG. 3 shows an example of architecture of an electronic-document reading device in which the present invention is implemented.

The electronic-document reading device SM2 comprises:
 a processor, microprocessor or microcontroller 300;
 a volatile memory 303;
 a non-volatile memory 302;
 an image capture device 305 such as a camera 305;
 a communication bus 301 connecting the processor 300 to the ROM memory 302, to the RAM memory 303 and to the image capture device 305.

The processor 300 is capable of executing instructions loaded into the volatile memory 303 from the non-volatile memory 302, from an external memory (not shown), from a storage medium, such as an SD card or the like, or from a communication network. When the electronic-document reading device SM2 is powered up, the processor 300 is capable of reading instructions from the volatile memory 303 and executing them. These instructions form a computer program that causes the implementation, by the processor 300, of all or part of the method described in relation to FIG. 7a or 7b.

Figure 7A:
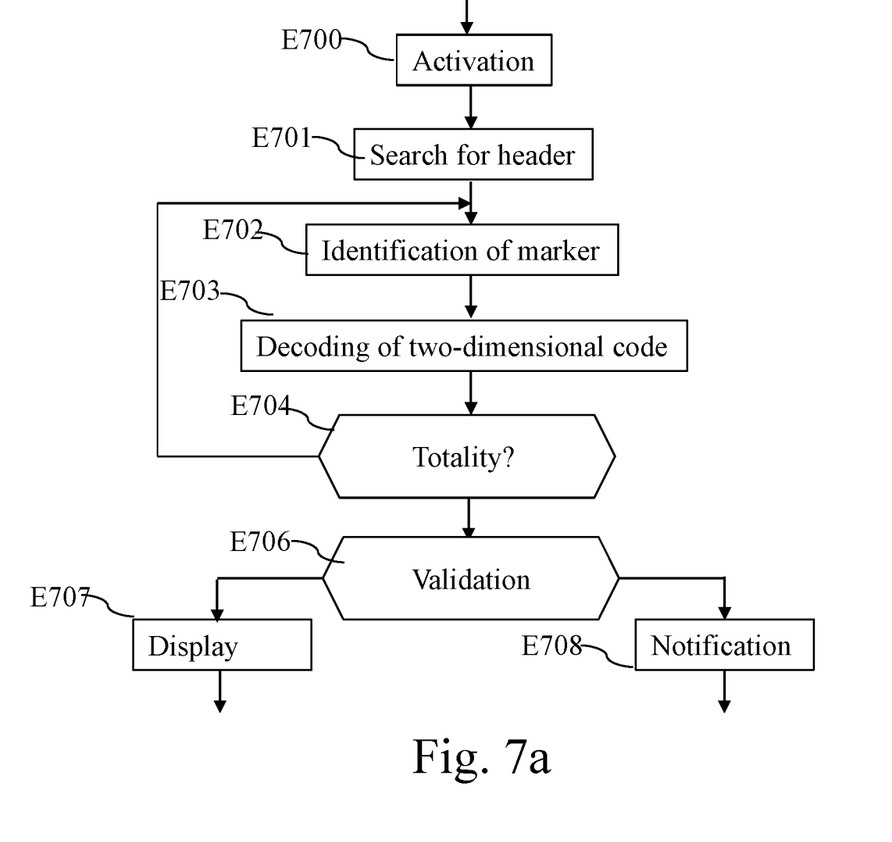
FIG. 7a shows a first example of an algorithm for capturing and processing a sequence of two-dimensional barcodes according to the present invention.
Figure 7B:
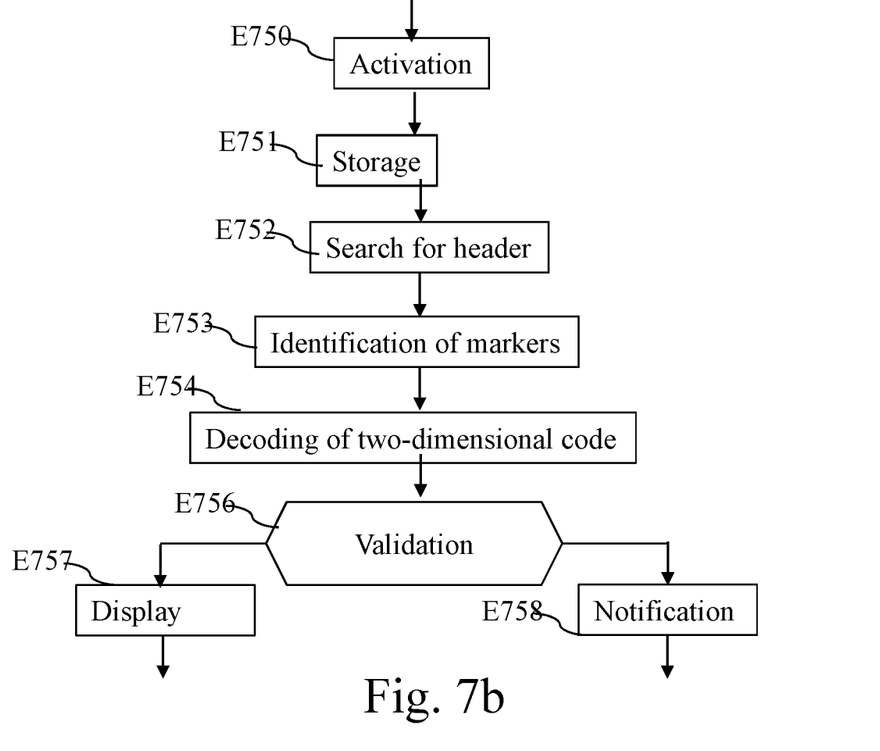
FIG. 7b shows a second example of an algorithm for capturing and processing a sequence of two-dimensional barcodes according to the present invention.

All or part of the method described in relation to FIG. 7a or FIG. 7b may be implemented in software form by the execution of a set of instructions by a programmable machine, such as a DSP (digital signal processor) or a microcontroller, or be implemented in hardware form by a machine or a dedicated component, such as an FPGA (field-programmable gate array) or an ASIC (application-specific integrated circuit).

Figure 4:
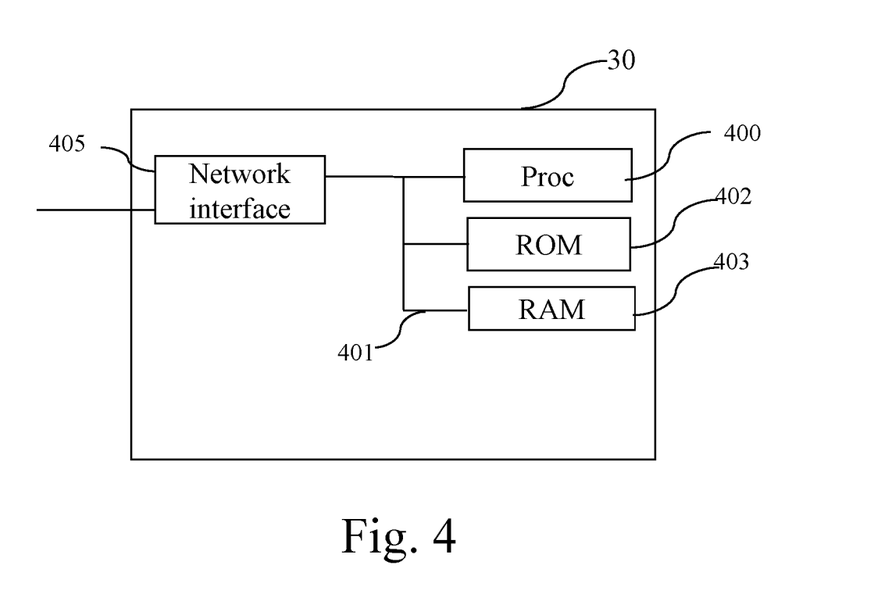
FIG. 4 shows an example of architecture of a device for generating an electronic document in which the present invention is implemented.

FIG. 4 shows an example of architecture of a device for generating an electronic document in which the present invention is implemented.

The device for generating an electronic document such as the server 30 comprises:
- a processor, microprocessor or microcontroller 400;
- a volatile memory 403;
- a non-volatile memory 402;
- a camera 405;
- a communication bus 401 connecting the processor 400 to the ROM memory 402, to the RAM memory 403 and to the camera 405.

The processor 400 is capable of executing instructions loaded into the volatile memory 403 from the non-volatile memory 402, from an external memory (not shown), from a storage medium, such as an SD card or the like, or from a communication network. When the device for generating an electronic document is powered up, the processor 400 is capable of reading instructions from the volatile memory 403 and executing them. These instructions form a computer program that causes the implementation, by the processor 400, of all or part of the method described in relation to FIG. 5.

All or part of the method described in relation to FIG. 5 may be implemented in software form by the execution of a set of instructions by a programmable machine such as a DSP (digital signal processor) or a microcontroller, or be implemented in hardware form by a machine or a dedicated component, such as an FPGA (field-programmable gate array) or an ASIC (application-specific integrated circuit).

FIG. 5 shows an example of an algorithm for generating a sequence of two-dimensional barcodes according to the present invention.

The present algorithm is described in an example in which it is executed by the processor 400 of the server 30. In a variant, the present algorithm is executed by the processor 200 of the electronic-document presentation device SM1.

At step E51, the processor 400 partitions the electronic document, digitally signed by means of a private key, into N partitions of a predetermined size. The predetermined size corresponds to the maximum number of bytes that a barcode used by the present invention can contain minus the space necessary for data of the index type and/or a header.

It should be noted here that, in a variant, the electronic document is encrypted prior to the partitioning.

At step E52, the processor 400 indexes each partition so as to identify the order in which the partitions must be reassembled in order to enable the electronic document to be reconstructed. The indexing is for example performed by allocating a number n to each partition with n=1 to N.

At step E53, the processor 400 forms a header that comprises, among other things, the number N of partitions. The header may further comprise the type of two-dimensional barcode used for the following barcodes. This is because the first two-dimensional barcode may be simple and robust in order to allow easy identification of the header and the following two-dimensional barcodes more dense in order to obtain a greater quantity of information.

At step E54, the processor 400 forms a two-dimensional barcode for each partition and its index. The index is for example placed in the first position in the data of the partition. The header is included in the barcode at dimensions formed from the partition having the first index or a two-dimensional barcode is formed for the header alone and which comprises the index 0 for example. The barcode is for example a QR code.

Since the current screens of smartphones have a resolution of at least 1080×1920 pixels, it will be possible to display a version 25 QR code with modules over 8 pixels, which represents a grid density/legibility compromise.

The same approach can be envisaged with another Data-Matrix coding format: this makes it possible to code, in its 144 lines by 144 columns version, 1556 bytes.

The modules will be a little smaller than in the case of a QR code, around 7 pixels, but with a size that is still acceptable for reading by a camera of a smartphone used by the inspector.

At step E55, the processor 400 adapts the display time to the screen of the electronic-document presentation device SM1.

Current cameras or smartphones have an acquisition speed generally of 30 images per second and the screens of these same smartphones have screen refresh speeds of around 30 images per second. So as not to have any problem of synchronisation when the sequence of two-dimensional barcodes is captured, it is necessary to envisage leaving each two-dimensional barcode image at least for a period at least equal to twice the time for which an image is displayed by the electronic-document presentation device SM1.

According to a first example embodiment of the present invention, each two-dimensional barcode is duplicated at least twice.

According to a second example embodiment, the processor 400 determines the display time of each barcode. Current cameras of smartphones have an acquisition speed generally of 30 images per second, so as not to have any synchronisation problem, each two-dimensional barcode is displayed at least during the time of acquisition of two images. The display time for each two-dimensional barcode is then 66 milliseconds.

At step E56, the processor inserts a delimiter between each two-dimensional barcode.

A delimiter is for example a predetermined image. The predetermined image is for example a black or white image.

At step E57, the processor 400 forms a sequence of two-dimensional barcodes.

The sequence of two-dimensional barcodes comprises each two-dimensional barcode as well as the inserted delimiters.

In a variant, the sequence of two-dimensional barcodes is put in a video format and comprises the display time for each barcode.

The sequence of two-dimensional barcodes is stored in the random access memory 203 of the electronic-document presentation device SM1.

FIG. 6 shows an example of an algorithm for transferring a sequence of two-dimensional barcodes according to the present invention.

The present algorithm is described in an example in which it is executed by the processor 200 of the electronic-document presentation device SM1.

At step E60, the processor 200 detects a request to activate the present algorithm made by the possessor 10 of the electronic document by means of the man-machine interface of the electronic-document presentation device SM1.

At the following step E61, the processor 200 reads, in the random access memory 203 of the electronic-document presentation device SM1, the sequence of two-dimensional barcodes.

At the following step E62, the processor 200 commands the display of the sequence of barcodes by the screen 205 of the electronic-document presentation device SM1.

If the sequence of two-dimensional barcodes is put in a video format, the processor 200 commands the display of the sequence of two-dimensional barcodes by the screen 205 at a rate corresponding to the display time for each barcode. The barcodes in the sequence of barcodes are displayed one after the other on the screen of the electronic-document presentation device SM1.

For example, the sequence of two-dimensional barcodes is displayed successively at least twice on the screen 205 of the electronic-document presentation device SM1.

FIG. 7a shows a first example of an algorithm for capturing and processing a sequence of two-dimensional barcodes according to the present invention.

The present algorithm is described in an example in which it is executed by the processor 300 of the electronic-document reading device SM2.

At step E700, the processor 300 activates the image capture device 305.

The image capture device 205 is activated as long as not all the barcodes in the sequence of two-dimensional barcodes have been decoded.

At step E701, the processor 300 seeks, among the images captured by the image capture device, a two-dimensional barcode that represents a header by decoding the two-dimensional barcodes. The processor 300 thus obtains the number N of the different two-dimensional barcodes present in the sequence of two-dimensional barcodes.

At the following step E702, the processor 300 identifies a marker in the sequence of captured barcodes.

At the following step E703, the processor 300 decodes the two-dimensional barcode following the marker detected and stores the content thereof and the index thereof.

At step E704, the processor 300 checks whether all the two-dimensional barcodes have been captured and decoded.

For example, the processor 300 checks whether the number of barcodes captured and decoded is equal to N.

If not, the processor 300 returns to step E702.

If so, the processor 300 passes to step E705.

At step E705, the processor 300 deciphers the signature by means of a public key.

At step E705, the processor 300 checks whether the signature is correct.

If not, the processor 300 passes to step E708 and demands the display of a message notifying the inspector of the failure of the signature verification.

If so, the processor 300 passes to step E707 and demands the display of a message notifying the inspector that the signature is correct.

Optionally, the processor 300 reconstructs the electronic document by means of the indices and demands the display of the electronic document on the screen of the device for capturing and processing a sequence of two-dimensional barcodes.

If the electronic document has been previously encrypted, prior to the display on the electronic document, it is deciphered.

FIG. 7b shows a second example of an algorithm for capturing and processing a sequence of two-dimensional barcodes according to the present invention.

The present algorithm is described in an example in which it is executed by the processor 300 of the electronic-document reading device SM2.

At step E750, the processor 300 activates the image capture device 305.

For example, the image capture device 305 is activated for a predetermined period.

The predetermined period is for example between 0.6 seconds and 10 seconds.

At step E751, each image captured by the image capture device 205 is stored in the volatile memory 303.

At the end of the predetermined period, the processor 300 passes to step E752, and seeks, among the images captured and stored by the image capture device 305, a two-dimensional barcode that represents a header by decoding the two-dimensional barcodes. The processor 300 thus obtains the number N of the different two-dimensional barcodes present in the sequence of two-dimensional barcodes.

At the following step E753, the processor 300 identifies each marker in the sequence of barcodes stored.

At the following step E754, the processor 300 decodes each two-dimensional barcode following each marker identified and stores the content thereof and the index thereof.

At step E755, the processor 300 deciphers the signature by means of a public key.

At step E756, the processor 300 checks whether the signature is correct.

If not, the processor 300 passes to step E758 and demands the display of a message notifying the inspector of the failure of the signature verification.

If so, the processor 300 passes to step E757 and demands the display of a message notifying the inspector that the signature is correct.

Optionally, the processor 300 reconstructs the electronic document by means of the indices and demands the display of the electronic document on the screen of the device for capturing and processing a sequence of two-dimensional barcodes.

Figure 8:
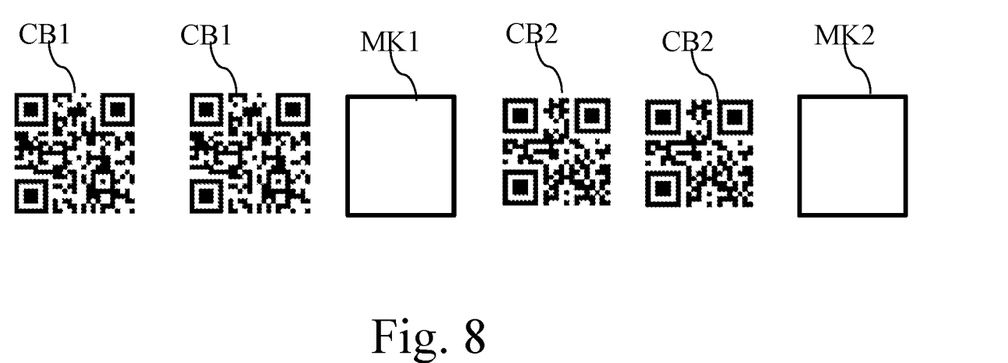
FIG. 8 shows a part of a sequence of two-dimensional barcodes according to the present invention.

FIG. 8 shows a part of a sequence of two-dimensional barcodes according to the present invention.

The part of the sequence of two-dimensional barcodes comprises two different two-dimensional barcodes CB1 and CB2 separated by markers Mk1 and Mk2.

Each two-dimensional barcode is duplicated twice.

The images of the sequence of two-dimensional barcodes are displayed successively on the screen of the electronic-document presentation device.

Naturally, the present invention is in no way limited to the embodiments described here but quite the contrary encompasses any variant within the capability of a person skilled in the art.

The invention claimed is:

1. A method for verifying the validity of an electronic document, wherein the method comprises:
activation of an image-capture device and capture of an image sequence displayed by a device presenting the electronic document, the image sequence comprising of different two-dimensional barcodes displayed successively in time one after the other, the two-dimensional barcodes representing a signature of the electronic document and parts of the electronic document,
decoding of the two-dimensional barcodes,
verification of the validity of the signature by means of a public key, and generation of a message representing the result of the verification.

2. The method according to claim 1, wherein the captured image sequence comprises a two-dimensional barcode representing a header comprising the number of two-dimensional barcodes representing the signature of the electronic document and the electronic document.

3. The method according to claim 2, wherein each two-dimensional barcode is captured at least twice in the image sequence.

4. The method according to claim 2, wherein the image capture device is activated as long as the number of two-dimensional barcodes decoded is less than the number included in the header.

5. The method according to claim 1, wherein two different barcodes are separated by an image not representing a two-dimensional barcode.

6. The method according to claim 1, wherein each two-dimensional barcode comprises an index enabling the electronic document to be reconstructed.

7. The method according to claim 1, wherein the image capture device is activated for a predetermined period and the decoding is done at the end of the predetermined period.

8. The method according to claim 1, wherein the method further comprises a step of deciphering the electronic document.

9. A device for verifying the validity of an electronic document, wherein the device comprises:
- means for activation of an image-capture device and capture of an image sequence displayed by a device presenting the electronic document, the image sequence comprising of different two-dimensional barcodes displayed successively in time one after the other, the two-dimensional barcodes representing a signature of the electronic document and parts of the electronic document,
- means for decoding of the two-dimensional barcodes,
- means for verification of the validity of the signature by means of a public key, and
- means for generation of a message representing the result of the verification.

* * * * *